United States Patent [19]

Chan

[11] Patent Number: 5,578,347
[45] Date of Patent: Nov. 26, 1996

[54] PROCESS FOR APPLYING A FINISH TO A METAL SUBSTRATE

[75] Inventor: Christina Chan, Catonsville, Md.

[73] Assignee: E. I. Du Pont de Nemours and Company, Wilmington, Del.

[21] Appl. No.: 556,348

[22] Filed: Nov. 13, 1995

Related U.S. Application Data

[63] Continuation-in-part of Ser. No. 362,354, Dec. 22, 1994, abandoned, which is a continuation-in-part of Ser. No. 248,033, May 24, 1994, abandoned.

[51] Int. Cl.$^6$ ..................................................... B05D 3/12
[52] U.S. Cl. ..................... 427/336; 427/348; 427/354; 427/355; 427/409; 427/410
[58] Field of Search .................................. 427/348, 352, 427/353, 354, 355, 356, 358, 368, 369, 377, 378, 409, 410, 336

[56] References Cited

U.S. PATENT DOCUMENTS 4,323,603  4/1982  Close ................................ 524/545

FOREIGN PATENT DOCUMENTS 58-15541  3/1983  Japan.
4190878  7/1992  Japan.

*Primary Examiner*—Shrive Beck
*Assistant Examiner*—Erma Cameron
*Attorney, Agent, or Firm*—James A. Costello

[57] ABSTRACT

A method for finishing or coating a metal substrate, in which the metal is first coated with a silane adhesion promoter as a thin film prior to application of a primer and/or basecoat or topcoat. The method, useful in the original manufacture of trucks, does not require sanding or baking to achieve adhesion of the coating to the substrate.

18 Claims, 2 Drawing Sheets

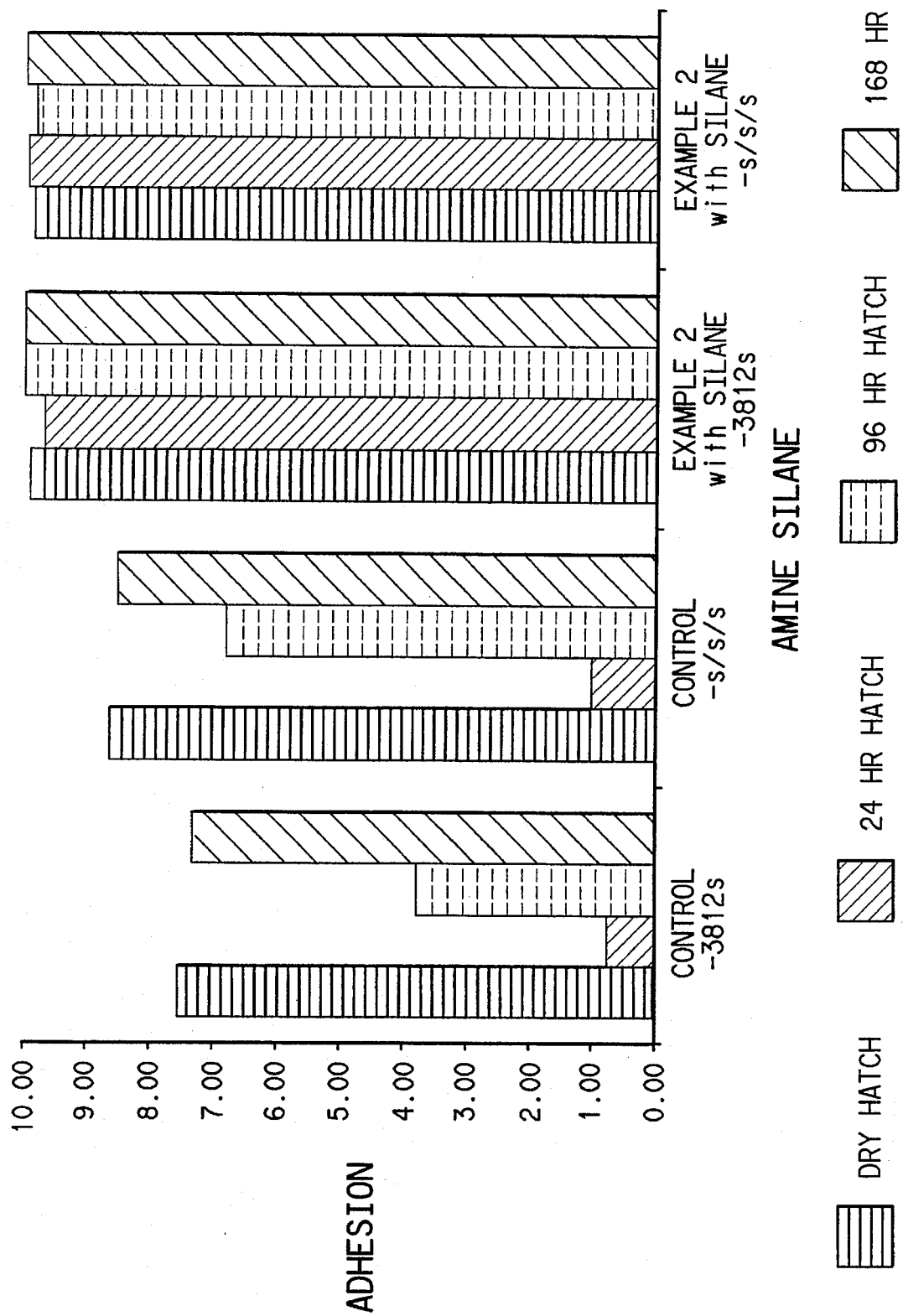

PROCESS FOR APPLYING A FINISH TO A METAL SUBSTRATE

CROSS REFERENCE TO RELATED APPLICATIONS

This application is a continuation-in-part of application Ser. No. 08/362,354, filed Dec. 22, 1994, now abandoned which is a continuation-in-part of application Ser. No. 08/248,033 filed May 24, 1994, now abandoned.

FIELD OF THE INVENTION

The present invention is directed to an improved process for coating or finishing a metal substrate including aluminum tracks and parts thereof, comprising applying a thin film of a silane adhesion promoter to the surface, with or without preliminary sanding or like mechanical surface treatment, and subsequently applying a primer and/or topcoat or basecoat over the adhesion promoter.

BACKGROUND OF THE INVENTION

The quality of the aluminum (substrate) used in track manufacturing varies greatly. This results in variable adhesion performances. To minimize this variability in adhesion, one can chemically treat the aluminum. Unfortunately, chemical treatment is expensive and requires special facilities. In this invention, the use of silane minimizes variability in adhesion of cleaned but untreated aluminum.

Walker, *JCT*, 52, 49–61 (1980), disclosed the general concept of organofunctional silanes adhesion promoters for use with organic surface coatings on metallic substrates. EP 0540 040 A1 discloses a room-temperature curable organopolysiloxane composition having highly durable adhesion to various substrates including glass, plastics and metal. U.S. Pat. Nos. 4,963,636, 5,008,349 and Japanese Publication Hei 3-408 (1991) also disclose silicone containing primers or adhesion promoters. Baker et al, *IN. J. Adhesion and Adhesives*, 12, 73–74 (1992) disclose the use of silane as an adhesion promoter in the manufacture of aircraft. U.S. Pat. No. 5,206,285 discloses a mixture of amino silane and epoxy silane compounds, in a particular molar ratio, as a corrosion inhibitor. Such references disclose application of silane adhesion promoters to polyurethane paints, sealing agents, adhesives and injection molding materials. U.S. Pat. No. 5,159,970 discloses the use of an aminosilane as an adhesion agent on a pattern before applying layers of ceramic material to build up a shell mold. Walker, In *JOCCA (J. Oil Col. Chem. Assoc.)*, 1982, 65, 415 and 436–443, discloses the use of organosilanes as adhesion promoters for two-pack urethane and epoxide paints on aluminum and mild steel substrate, wherein the adhesion promoters are either applied as pretreatment primers or incorporated into the paint. Walker discloses improvement in adhesion to both degreased substrates and to grit blasted surfaces. See also Walker, *JCT*, 52. no. 670 (1980) and Walker, *JOCCA*, 1984, 4, 108–112, and Cave et al, *J. Adhesion*, 1991, 34, 175–187.

The latter references do not mention application to automotive surfaces. In the automotive industry, high performance finishes or coatings meeting the highest standards of durability and appearance are necessary. This involves surface treatment of the metal substrate before applying a plurality of layers of different coatings, for example, a primer, primer surfacer, basecoat and/or clearcoat. With respect to trucks, as compared to cars or airplanes, it is usually not practical to treat the metal substrate by acid anodizing with phosphates or chromates to prepare the surface prior to applying the finish. Instead, the surfaces of trucks are typically subjected to mechanical surface treatment in order to obtain satisfactory adhesion of the subsequent finish. For example, sanding of the surface is commonly practiced. Nevertheless, finishers continue to suffer adhesion losses and other problems when painting tracks in the process of manufacture. This invention solves adhesion problems with respect to the finishes on trucks without increasing process costs significantly.

SUMMARY OF THE INVENTION

This invention concerns a process for coating a metal substrate, comprising the steps:

(i) applying to a clean substrate, one that has not been subject to an acid etch or acid anodization treatment, a solution of one or more uncopolymerized silanes at least one of which is selected from the group consisting of

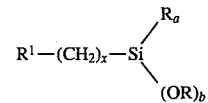

wherein x is an integer between 1 and 3, R is the same or different alkyl having 1 to 3 carbons, a is 0 or an integer between 1 and 3, b equals 3-a, and $R^1$ is selected from the group consisting of:

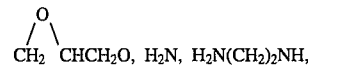

wherein z is 0 or an integer of 1 to 3;
said silane being present in a concentration of 0.001 to 10.0 percent by weight of the solution and being present on the substrate in a dry thickness of less than 0.1 mil; and (ii) modifying the substrate surface by virtue of step (i) to accept adherence of a subsequent coating without intermediate thermal decomposition of the silane.

By "clean substrate" is meant that the substrate has been abraded, solvent-washed or soap and water-washed but not chemically treated by a chemical etch such as chromic acid, or by chemical anodization such as with phosphoric acid or chromic acid. After the substrate is clean, a thin, substantially uniform layer (film) of silane is applied. By "thin" is meant a layer on the order of a monolayer or an amount not significantly in excess thereof, e.g., having a dry thickness less than 0.1 mil, preferably up to about 100 Å. The necessary thinness of the silane coating is assured by removal of excess silane. This is typically accomplished by finishing with water or aqueous-organic solvent, wiping with a water-wet material or blowing with air. Residual water is removed by drying (forced or natural) prior to application of the primer and/or topcoat.

The process of this invention works best when the dry silane coating provides substantially complete coverage of the metal substrate to the desired thickness. Incomplete coverage by the silane will result in no benefit in the uncovered substrate areas. Silane coverage which is significantly above the recited upper limit will likewise adversely affect adhesion. Substantially uniform coverage within the recited range of less than 0.1 mil will provide the most satisfactory results.

Preferred processes are those wherein the silane is selected from A, B, and from a combination of A and B:

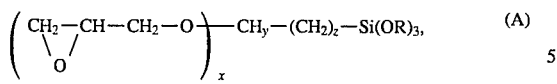

wherein x is an integer between 1 and 3, y equals 3-x, z is an integer between 1 and 3, and R is an alkyl group having 1 to 3 carbon atoms, and

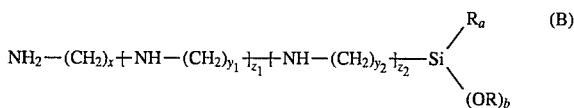

wherein x is an integer between 1 and 3, $y_1$ and $y_2$ are independently selected integers between 1 and 3, $z_1$ and $z_2$ are independently selected integers between 0 and 3, R is the same or a different alkyl group having 1 to 3 carbons, a is an integer between 0 and 3 and b equals 3-a, x and y being selected independently of one another.

Most preferred are processes wherein the silane is selected from at least one member of the group consisting of

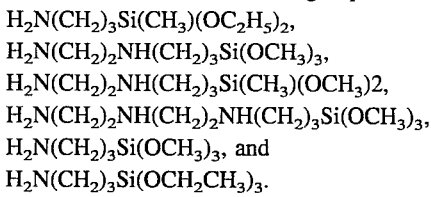

Useful epoxy silane compounds include γ-glycidoxypropyltrimethoxy silane and the like.

The process of this invention also comprises the optional step of applying a primer over the silane, and applying to the primer a basecoat or topcoat, or, applying over the silane a basecoat or topcoat in the absence of a primer.

In the process of this invention, the metal is selected from steel and aluminum and any other metal that would benefit from the described finish. Preferred silane compounds are an amino silane alone, or a mixture of an epoxy silane compound and an amino silane compound in a molar ratio of one epoxy group to one amino hydrogen group. Optionally, acid addition, e.g., acetic, carbonic, or phosphoric and the like, can be employed. The primer coat can be applied in the form of a two-package polyurethane or epoxy primer to the silane. Thereafter, a basecoat or topcoat can be applied to the substrate over the primer.

One method for practicing this invention, where the substrate is a metal vehicle body, is as follows. The substrate should be clean. If necessary, a solvent can be employed as a cleaning agent. The substrate can be optionally sanded, and then a very thin film of an aqueous solution of a silane adhesion promoter is applied. Finally, a primer, primer surfacer, and/or basecoat or topcoat is applied over the thin film of silane. Process steps are as follows:

(a) cleaning the aluminum surface to remove contaminants, (b) applying a thin layer of an aqueous solution of an adhesion promoter comprising 0.001 to 10 percent, by weight of the aqueous solution, of at least one epoxy silane compound, amino silane compound, or mixtures thereof;

(c) removing excess silane; and (d) applying a primer and/or basecoat or topcoat to the track.

The term "truck," as used herein, is inclusive of trucks, cabs, body trailers, and parts thereof.

In the process of this invention, the silane coating comprises a solution or dispersion of silanes which are not copolymerized together. Application of this intermediate silane coating is effected at or near room temperature and, in any event, need not be followed by baking in order to achieve the improved adherence of a subsequent finishing coat. Although drying or baking is permissible, it is decidedly not necessary to the practice of this invention. The silane is not added to a pigmented primer as an additive. The silane solutions are storage stable and can be employed effectively several weeks after their initial formation. The substrates are not treated prior to the silane application by chemical means. Finally, the silane is applied in a very thin coating as explained earlier.

The adhesion promoter works optimally whether or not the metal surface has been sanded or subjected to other like mechanical treatment. This is a significant advantage because sanding is labor intensive, creates airborne particulate contamination, and is particularly difficult to accomplish with respect to louvered or grooved surfaces, particularly of track bodies. The adhesion promoter, applied according to the present invention, has also been found to improve blister resistance and to improve adhesion to the extent that an intermediate primer may not be necessary before applying the topcoat or basecoat/clearcoat to the track surface. In addition to promoting adhesion of coatings(s) to a metal substrate, it has been found that the process of this invention is useful to inhibit corrosion formation on steel. The process is also applicable to coating metal substrates in other industries outside of truck manufacturing. Although intermediate thermal decomposition of the silane is not necessary to achieve the benefits of this invention, such decomposition may be effected if desired.

BRIEF DESCRIPTION OF THE DRAWINGS

FIG. 2 shows a graph of the comparative results on paint adhesion of an amino silane pretreatment according to the present invention, wherein the paint is a polyurethane topcoat over a primer.

DETAILS OF THE INVENTION

Figure 1:
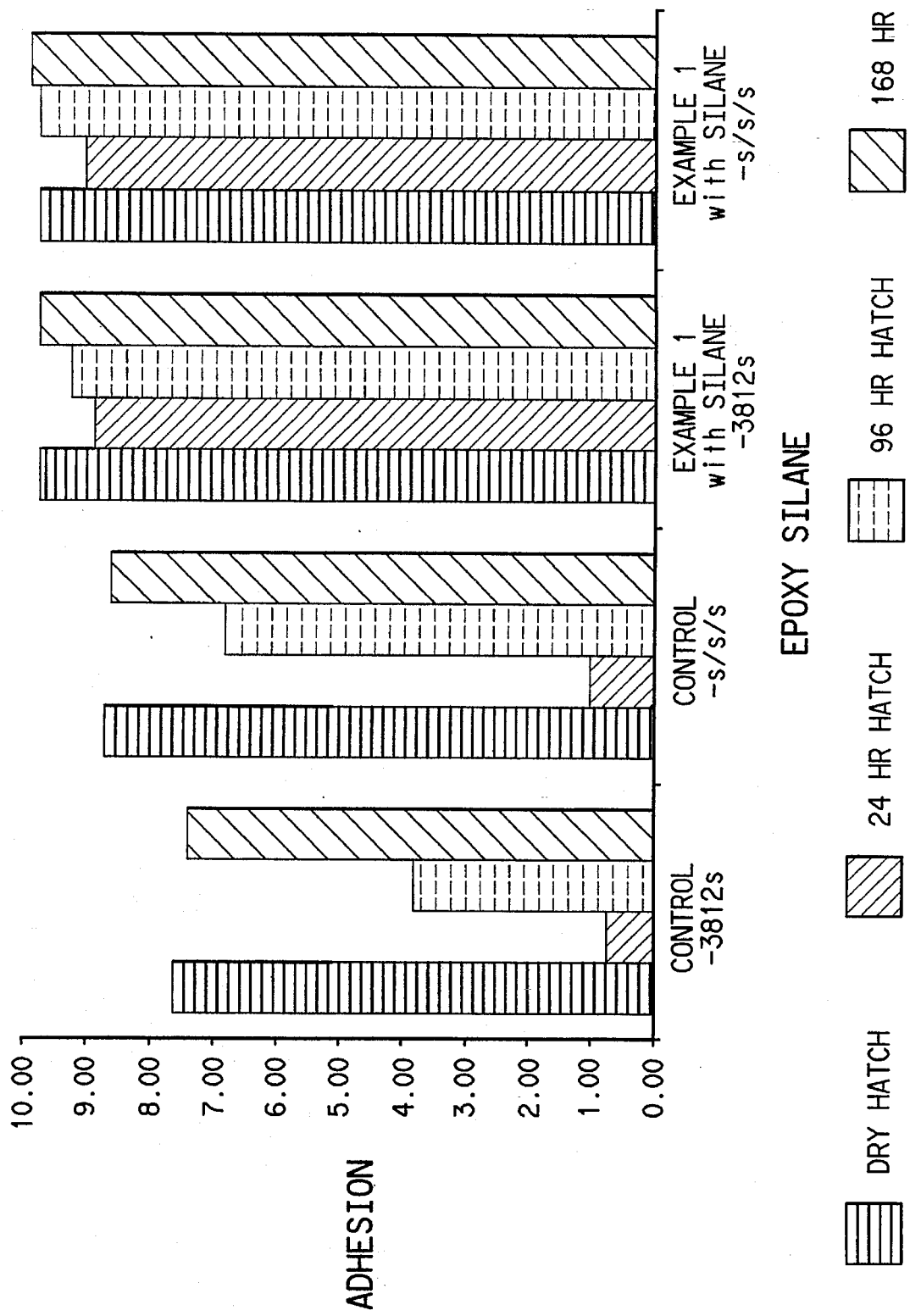
FIG. 1 shows a graph of the comparative results on paint adhesion of an epoxy silane pretreatment according to the present invention, wherein the paint is a polyurethane topcoat over a primer.

The present invention is directed to an improved method of finishing or coating a metal surface by applying a thin film of an adhesion promoter to the metal surface before the subsequent application of pigmented coatings. The silanes useful in the invention include conventional silane adhesion promoters, including both epoxy silane s and amino silanes. In one embodiment of the present invention, a mixture of amino silane compounds and epoxy silane compounds, particularly in a molar ratio providing one epoxy group for each primary amino hydrogen (with or without acid), has been found to be effective, typically under hydrous conditions.

Topcoats that may be used with the present invention include polyurethane, polyester, acrylic, alkyd, and combinations thereof. Commercially available products include Imron®, Chroma One®, Centari®, Cronar®, Dulux®, and Lucite® automotive paint products, all commercially available from E. I. du Pont de Nemours and Company (Wilmington, Del.). Two-pack urethanes are used in a preferred embodiment. Primers include polyurethane and epoxy systems such as Uroprime® , Codar® and the like. The chemistry for the polyurethane primer consists of two hydroxy-functional resins, one polyester and one acrylic, cured with an isocyanate. The chemistry for the epoxy primer consists of an epoxy-functional polymer crosslinked with either a polyamide or a poly-ketamine.

An important part of the coating process is surface preparation, which is required for proper adhesion. However, time and expense must usually be kept to a minimum. To insure initial and long-term adhesion, the finisher must remove airborne contamination and layers of protective oil. Preliminary treatment should include solvent cleaning to remove oils and greases.

It has been found that mechanical abrasion of the metal surface is not generally necessary. By mechanical abrasion is meant the use of sand paper, grit- or shot-blasting, and the like. Chemical treatment, meaning chromic acid anodizing and phosphoric acid anodizing, is also not used in the context of the present invention. In fact, when a layer of silane treatment was sprayed on, it was found that solvent-wiped-only panels gave similar adhesion to the solvent/sand/solvent-wiped panels. This results in improved turn-over and shorter production time for painting a vehicle, which in mm saves material, money and time.

In the cleaning step, in order to be sure there is no wax, grease, silicone, dust, or other contaminants, a wax and grease remover, solvent, acid, or base wash, or soap/water can be used to clean the surface. Paint will not adhere properly to a waxy surface. To apply the wax and grease remover, a clean, dry cloth or paper towel may be soaked in solvent and applied to the surface of the track. For maximum effectiveness, the wax and grease remover should be wiped while it is still wet, before drying. Following solvent wipe, a sanding step is optional, but not generally required.

A preferred solvent composition comprises about 80 to 95 percent by weight of an aqueous medium and about 5 to 20 percent by weight of an organic medium substantially miscible with the aqueous medium, the organic medium comprising, by weight:

(a) about 10 to 50 percent of an alkyl ester;

(b) about 40 to 85 percent of a glycol ether selected from propoxy alkanol and ethoxy alkanol; and (c) about 2.5 to 10 percent of a non-ionic surfactant.

After cleaning the surface, the silane adhesion promoter is used at a concentration of 0.001 to 10 percent, preferably 0.1 to 5.0 percent, most preferably 0.5 to 3.0 percent by weight of the composition. Solvents include water, ethanol, isobutanol, isopropanol, ethylene glycol, monobutyl ether, allyl ester, glycol ether, or mixtures thereof, or water in admixture with any of the foregoing. The solution can also include catalysts such as phosphoric acid, carbonic acid, acetic acid, DABCO (triethylenediamine) and a DDBSA/AMP solution, wherein DDBSA is an amine blocked dodecyl benzene sulfonic acid solution in isopropanol and AMP is 2-amino-2-methyl-1-propanol with 5% water. A suitable pH is 2.5–12, which can be obtained using any of the above catalysts. An acid or base catalyst can be included in the silane solution to give adhesion results as good as the silane solution by itself.

The silane adhesion promoter, either in pure or concentrated form in non-aqueous solvent, can be mixed with water and aqueous solvent just before use or it can be mixed in an aqueous solvent and used directly. The mixture is suitably allowed to hydrolyze for 5 minutes and used immediately or stored for an extended period prior to use. It has been found that the composition is storage stable and is effective even after several weeks when used at the low concentrations disclosed herein.

The solution containing the silane promoter can be applied by brushing, wiping, spraying or soaking with the excess removed, in order to provide a thin film of the solution over the surface to be painted. The thin film can be dried at ambient temperature or can be baked. The dry time ranges from 1 minute to 24 hours, preferably 5 minutes to 90 minutes prior to application of an optional primer and/or basecoat or topcoat. A primer, basecoat or topcoat is typically cured at room temperature or alternately baked for 30 minutes at 180° F.

Another advantage of the present invention is that the silane pretreatment improves adhesion of topcoat or basecoat/clearcoat directly to metal, without the need of a primer in between. The silane-treated panels show improved humidity resistance over panels without the silane primer/pretreatment. Conventional primers, which are used under a basecoat or topcoat, have a polymeric binder system and pigment. Such primers contain sufficient amounts of pigment and film-forming polymers to form an opaque or solidly colored coating which provides complete hiding and which provides a cured or dried film thickness of 0.2 to 2 mils. The present invention, by contrast, can be clear or translucent, can contain little or no polymeric components (under 5% by weight, preferably 0 to 2% by weight of the the composition) and have little or no pigment content (under 5%, preferably 0 to 2% by weight of the composition). In addition, if a primer is used, the adhesion is significantly improved with the use of silane.

The following Examples illustrate the invention. All parts and percentages are on a weight basis unless otherwise indicated.

EXAMPLE 1

This Example illustrates the effect of a pretreatment according to the present invention on paint adhesion. The results of this Example are depicted in FIG. 1. Low grade aluminum and marginally treated aluminum from the truck industry were used according to the general procedure outlined hereafter. These panels were wiped with solvent before sanding and wiped again with solvent (s/s/s) after sanding. Some panels were not sanded and were only wiped with solvent fast-dry enamel reducer (3812S), commercially available from E. I. du Pont de Nemours and Company.

A 1 weight percent solution of an epoxy silane, α-glycidoxypropyl-trimethoxy-silane, in water was mixed and allowed to sit for 5 to 60 minutes to hydrolyze the solution and then sprayed onto some of the marginally treated/cleaned panels. The silane-treated panels were either:

(a) baked at 100° F. or 140° F for ½ hour up to 1 hour and allowed to cool prior to topcoating, or, (b) allowed to sit for 5 minutes or up to 24 hours under forced air drying or ambient conditions prior to coating. Excess silane was removed by finishing with water. Once the panels were treated with the silane, they were either primed prior to topcoating or topcoated directly. Each panel was tested for dry initial adhesion (dry hatch) and wet adhesion after 24, 96 and 168 hours (24, 96, 168 hatch) of humidity, using the cross hatch test method. The rating of the cross hatch adhesion ranged from 0 (no adhesion) to 10 (perfect adhesion).

The results shown in FIG. 1 are average adhesion values obtained on several hundred panels prepared by all of the cleaning, application and drying methods described above.

These results therefore represent a wide variety of cleaning, application and drying methods employed in truck manufacture. They compare the results of a high solids polyurethane topcoat (Imron®5000, E. I. du Pont de Nemours and Company) with a primer, e.g., epoxy (Corlar®) or polyurethane (Uroprime®) over aluminum where the panels were either sanded or solvent-wiped, with the silane sprayed on to a thickness of no more than about 50 Å. The topcoat polyurethane was formed from two hydroxy-functional resins, one polyester and one acrylic, cured with 1,6 hexamethylene diisocyanate adduct ("Tolonate" HDT-90, Rhone-Poulenc). The polyester resin was derived from benzoic acid, pentaerythritol, neopentyl glycol, isophthalic acid, phthalic anhydride, and adipic acid. The acrylic resin was derived from styrene, ethyl methacrylate, lauryl methacrylate, and hydroxyethyl acrylate. Additional information is contained in U.S. Pat. Nos. 4,215,023 and 4,281,078 concerning the polyurethane. The 3812S Control and the s/s/s Control are identical to the 3812S-silane and s/s/s-silane systems except they were not treated with silane before the primer and/or topcoat was applied.

EXAMPLE 2

This procedure was carried out as in Example 1, except an amino silane, γ-aminopropyltriethoxy silane [$H_2N(CH_2)_3Si(OCH_2CH_3)_3$], rather than an epoxy silane, was used to treat the aluminum panels. The silane was sprayed onto the panels to a thickness of no more than about 50 Å. The results are shown in FIG. 2. The panels treated according to the present invention performed better than the controls (same primer-topcoat system applied direct to aluminum without silane pretreatment).

Absence of the silane coating (See Table 1,Test 1 results) and use of silane but failure to remove excess (Test 2 results) demonstrate inferior adhesion versus silane application/removal of excess (Test 3 results). The substrate was aluminum panels. The systems were otherwise as described in Example 1.

TABLE 1

| | | | | ADHESION RESULTS | | |
|---|---|---|---|---|---|---|
| Test | Silane[1] | Rinse | Dry Initial | 24 hr Wet Adhesion | 96 hr Wet Adhesion | 168 hr Wet Adhesion |
| 1 | No | No | 8.1 | 2.3 | 5.4 | 7.1 |
| 2 | Yes | No | 5.4 | 0.0 | 0.3 | 1.1 |
| 3 | Yes | Yes[2] | 9.8 | 9.7 | 9.8 | 9.9 |

[1]Silane of Example 2
[2]Rinsed with deionized water

EXAMPLE 3

This Example was carried out by the general procedure of Example 1 with results reported in Table 2. In all instances, adhesion on steel and aluminum was better for epoxy silane- and amine silane-coated surfaces versus the controls.

TABLE 2

| | CROSS-HATCH ADHESION RESULTS* | | | |
|---|---|---|---|---|
| | DRY | WET ADHESION | | |
| Silane/Substrate | Initial | 24 hr | 96 hr | 168 hr |
| Control/Al/urethane topcoat | 8.1 | 2.3 | 5.4 | 7.1 |

TABLE 2-continued

| | CROSS-HATCH ADHESION RESULTS* | | | |
|---|---|---|---|---|
| | DRY | WET ADHESION | | |
| Silane/Substrate | Initial | 24 hr | 96 hr | 168 hr |
| Al/epoxy silane/urethane topcoat | 9.1 | 9.3 | 9.6 | 9.9 |
| Al/amine silane/urethane topcoat | 9.8 | 9.7 | 9.8 | 9.9 |
| Control/Steel/urethane topcoat | 7.9 | 6.6 | 6.8 | 7.1 |
| Steel/epoxy silane/urethane topcoat | 9.0 | 9.5 | 9.0 | 8.5 |
| Steel/amine silane/urethane topcoat | 9.3 | 9.2 | 9.3 | 9.6 |

*The urethane topcoat and primer systems are as defined in Example 1.
The epoxy silane is that defined in Example 1.
The amine silane is that defined in Example 2.

I claim:
1. A process for coating a metal substrate, comprising the steps:
  (i) applying to a clean substrate, one that has not been subject to an acid etch or acid anodization treatment, an aqueous solution of one or more uncopolymerized silanes at least one of which is selected from the group consisting of

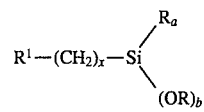

wherein x is an integer between 1 and 3, R is the same or different alkyl having 1 to 3 carbons, a is 0 or an integer between 1 and 3, b equals 3-a, and $R^1$ is selected from the group consisting of:

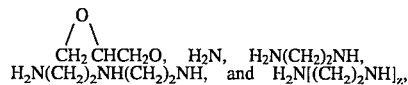

where z is 0 or an integer of 1 to 3;
  said silane being present in a concentration of 0.001 to 10.0 percent by weight of the solution and being present on the substrate in a dry thickness of less than about 0.1 mil;
  (ii) removing excess silane by finishing with water or aqueous organic solvent, wiping with a water-wet material or blowing with air; and
  (iii) modifying the substrate surface by virtue of steps (i) and (ii) to accept adherence of a subsequent coating without intermediate thermal decomposition of the silane.
2. A process according to claim 1 wherein the silane is selected from at least one of A and B:

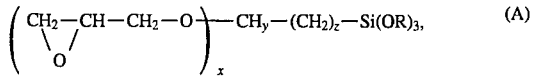

wherein x is an integer between 1 and 3, y equals 3-x, z is an integer between 1 and 3, and R is an alkyl group having 1 to 3 carbon atoms, and

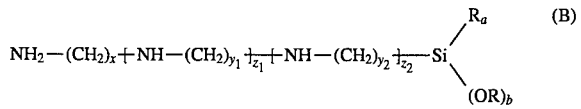

wherein x is an integer between 1 and 3, $y_1$ and $y_2$ are independently selected integers between 1 and 3, $z_1$ and $z_2$ are independently selected integers between 0 and 3, R is the same or a different alkyl group having 1 to 3 carbons, a is an integer between 0 and 3 and b equals 3-a, x and y being selected independently of one another.

3. A process according to claim 2 wherein the silane is selected from at least one member of the group consisting of $H_2N(CH_2)_3Si(CH_3)(OC_2H_5)_2$, $H_2N(CH_2)_2NH(CH_2)_3Si(OCH_3)_3$, $H_2N(CH_2)_2NH(CH_2)_3Si(CH_3)(OCH_3)_2$, $H_2N(CH_2)_2NH(CH_2)_2NH(CH_2)_3Si(OCH_3)_3$, $H_2N(CH_2)_3Si(OCH_3)_3$, and $H_2N(CH_2)_3Si(OCH_2CH_3)_3$.

4. A process according to claim 1 comprising the additional step of applying a primer over the silane.

5. A process according to claim 4 comprising applying to the primer a basecoat or topcoat.

6. A process according to claim 1 comprising the additional step of applying over the silane a basecoat or topcoat in the absence of a primer.

7. A process according to claim 1 for inhibiting corrosion and promoting adhesion wherein the metal is selected from the group steel and aluminum, respectively.

8. A process according to claim 2 comprising applying a primer over the silane.

9. A process according to claim 3 comprising applying a primer over the silane.

10. A process according to claim 8 comprising applying a basecoat or topcoat to the primer.

11. A process according to claim 9 comprising applying a basecoat or topcoat to the primer.

12. A process according to claim 8 comprising applying a basecoat or topcoat to the primer.

13. A process according to claim 2 wherein the silane compounds are a mixture of an epoxy silane compound and an amino silane compound in a molar ratio of one epoxy group to one amino hydrogen group optionally in the presence of a catalyst.

14. A process according to claim 1 comprising applying a two-package polyurethane or epoxy primer to the silane.

15. A process according to claim 14 comprising applying a basecoat or topcoat to the primer.

16. A process according to claim 1 comprising cleaning the substrate with a solvent composition comprising about 80 to 95 percent by weight of an aqueous medium and about 5 to 20 percent by weight of an organic medium substantially miscible with the aqueous medium, the organic medium comprising, by weight:

(a) about 10 to 50 percent of an alkyl ester;

(b) about 40 to 85 percent of a glycol ether selected from propoxy alkanol and ethoxy alkanol; and (c) about 2.5 to 10 percent of a non-ionic surfactant.

17. A process according to claim 1 comprising the step of removing excess silane before application of primer, basecoat or topcoat by finishing with water.

18. A process according to claim 3, wherein the silane is $H_2N(CH_2)_3Si(OCH_2CH_3)_3$.

* * * * *